3,075,823
METHOD OF TREATING WATER-INSOLUBLE LINEAR POLYAMIDE CONDENSATION POLYMERS WITH ANHYDROUS HYDROGEN HALIDE GAS AND THEN MOISTURE TO HYDROLYZE THE POLYAMIDE SURFACE
Lloyd H. Reyerson, St. Paul, and Lowell E. Peterson, Anoka, Minn., assignors to Regents of the University of Minnesota, Minneapolis, Minn., a corporation of Minnesota
No Drawing. Filed Aug. 21, 1957, Ser. No. 679,525
10 Claims. (Cl. 8—115.5)

This invention relates to a method of altering the physical surface characteristics of polyamide condensation polymers, generically known as nylon. More particularly this invention relates to a method of treating nylon fibers, filaments, yarns, threads, and the like to alter the composition of the exterior monolayers to improve the color and lustre and to impart anti-static characteristics.

This invention is related to the invention described and claimed in our co-pending application Serial No. 474,024, filed December 8, 1954, now Patent No. 2,876,524, issued on March 10, 1959. This application is a continuation-in-part of our prior co-pending application.

Our earlier invention was based upon the discovery that if linear polyamide condensation polymers are made to assume a particular configuration and while so disposed are treated with a substantially anhydrous hydrogen halide gas, the polymers will continue to retain that configuration upon removal of the gas from the polymer. As an example, nylon yarn wound about a mandrel and exposed to hydrogen chloride gas retained a permanent crimp or curl after the gas had been removed. The success of our earlier invention depends upon complete desorption of the hydrogen halide gas.

It has now been discovered that linear polyamide condensation polymers may be subjected to a controlled atmosphere of substantially anhydrous hydrogen halide gas to cause a surface sorption of the gas by the polymers and then, without desorption of the gas, the treated polymers may be exposed to moisture.

Exposure of the linear polyamide condensation polymers to the anhydrous hydrogen halide gas results in sorption of the gas at the amide linkages and causes breaking of the hydrogen bonds to the next adjoining chain. When the gas treated polymers are exposed to moisture, hydrolysis occurs at the carbonyl-amide linkages and breaks the bonds between the links in the linear polymer chains. By these means, the bonds between the adjacent surface chains are broken and the links of the chains are broken. Thus, carboxyl groups are formed at the surfaces of the polymers and the physical characteristics of the surface are altered. Anti-static properties are imparted to the polymers. The inherent, shiny, transparent-translucent appearance of natural nylon is replaced by a white, chalky, opaque surface layer. The nylon is rendered more easily susceptible to dyeing.

In its preferred embodiment this invention comprises the method of altering the physical surface characteristics of linear polyamide condensation polymers, which comprises exposing the polymers to an atmosphere of substantially anhydrous hydrogen halide gas, under controlled conditions of time, temperature, pressure and concentration of hydrogen halide gas to cause a sorption of gas by the polymer only at the surface to break the bonds between the polymer chains and thereafter exposing the gas treated surfaces to moisture to hydrolyze the carbonyl-amide linkages in the polymer surfaces to break the bonds between the individual links.

Depending upon their diameter nylon filaments may contain from several thousand to millions of layers. In general, it is the object of this invention to treat only the surface of the nylon. This may include a very mild treatment in which less than all of the first layer is altered, but, for most purposes, it includes the first two, three or four layers. In some instances, a deeper surface treatment may be desirable, particularly of filaments of larger diameters. The treatment should not be carried beyond the point where further gas sorption and hydrolysis would weaken the nylon structure sufficiently to reduce its usefulness.

While substantially anhydrous hydrogen chloride gas is a preferred treating gas from the standpoint of cost, ready availability in commercial amounts of high purity, ease of handling, and like, the invention is not limited to the use of hydrogen chloride alone but also contemplates the use of hydrogen bromide, hydrogen iodide and hydrogen fluoride as well. Hydrogen bromide is a satisfactory material although it is sorbed by the polymer surfaces somewhat more slowly than hydrogen chloride. Hydrogen fluoride is difficult to handle because of its extreme reactiveness and its corrosiveness and toxicity. Hydrogen iodide is less reactive and because of the size of its molecule, is a less satisfactory treating material than hydrogen chloride. Hydrogen bromide and hydrogen iodide are more easily oxidized and thus are more difficult to maintain pure in the gaseous state.

The degree of sorption of the hydrogen halide gas is dependent not only upon the reactiveness of the gas but also upon concentration, pressure, time and temperature conditions. Sorption varies directly with gas concentration. Thus, with high concentrations of hydrogen halide gas sorption of the gas by the surface layers of nylon is almost instantaneous. When high concentrations of gas are used only a few seconds exposure time is necessary or desirable. When using a highly reactive hydrogen halide gas in high concentrations adequate sorption of gas may be obtained in only a fraction of a second. Control is easier with lower concentrations of hydrogen halide gas. For this reason, it is preferable to employ an atmosphere of hydrogen chloride gas diluted with dry air, or, for example, in the case of hydrogen bromide and hydrogen iodide, which are readily oxidized in the gaseous state, the dilution may be with an inert gas, such as nitrogen or carbon dioxide.

The sorption of hydrogen halide gas by nylon is limited to some extent by the use of temperatures above room temperature. This fact may be used as a means of control. Where higher concentrations of hydrogen halide gas are employed, sorption of the gas into the surface of the polymers may be limited by the use of higher temperatures ranging from room temperature to just below the softening point of nylon. Similarly, when employing low concentrations of hydrogen halide gas sorption may be accelerated by the use of low temperatures from room temperature down to −80° C.

The sorption of hydrogen halide by the polymers may be carried out at any desired positive pressure. For laboratory equipment, pressures ranging from about 1 mm. Hg to about 100 cm. Hg were found to produce the desired changes in physical surface characteristics in reasonable time. Higher pressures may be used where high pressure equipment is available, with a corresponding decrease in the required time for treatment.

By proper selection of treating gas, temperature, pressure and concentration the time of exposure required for the desired sorption of the gas by the surface layers only may be anywhere from a fraction of a second to a period of hours. For convenience, it is desirable that the gas sorption phase of the method be carried out with exposure time ranging from about one-half second to ten minutes. Typical operating conditions are illustrated in the examples.

Because of the differences in reactiveness of the several hydrogen halide gases and the interrelation of the concentration, temperature, pressure and time conditions, it is virtually impossible to define any meaningful range of operable conditions, but the varying conditions are amply illustrated. In general, rapid treatment of the polymers is obtained by the use of higher concentrations of gas at lower temperatures and conversely slow treatment is obtained by the use of lower concentrations of gas at higher temperatures. The ultimate aim is a proper balance of conditions to give a suitable surface treatment in a time span of convenient length.

After sorption of the hydrogen halide gas by the surface layers of the nylon polymer, the treated polymer is exposed immediately to moisture to carry out the desired hydrolysis reaction. Preferably the gas treated polymers are subjected to moisture in a gaseous phase by passing the polymers through a chamber of high relative humidity such as a steam chamber. Alternatively, the gas treated polymers may be passed through a water bath. Obviously, the polymers must be water insoluble. Where the extent of surface treatment is regulated by the amount of gas sorbed the time of exposure to moisture is not critical. The hydrolysis should then be allowed to be complete so that no desorbed hydrogen halide gas remains in the polymers. The hydrolysis reaction occurs almost instantaneously. The polymers with hydrolyzed surfaces may simply be dried in air.

If the hydrogen halide gas was sorbed uniformly by the layers of nylon and if hydrolysis occurred uniformly, both as to area and depth, then each layer in turn would tend to become separated from the layer underlying it, and, since the linkages between the chains are broken, the uppermost treated layers could be easily rubbed off. However, the layers are heterogeneous so that preferential gas sorption and hydrolysis takes place in the layers but these areas of preferential treatment are widely and substantially uniformly distributed throughout the polymers. Thus, with normal exposure to gas some gas is sorbed by the second layer before sorption by the first monolayer is complete and a lesser amount of gas is sorbed by the third layer, etc. Hydrolysis takes place similarly. To prevent total destruction and removal of the outside monolayers the surface treatment may be limited by limiting either the total sorption of gas by the polymers and completely hydrolyzing, or, by permitting excess sorption of gas, limiting surface treatment by limiting hydrolysis (i.e., by control of amount of available moisture or time of treatment) and then immediately drying the polymer and desorbing the excess gas. Since there are such a large number of layers in a filament of normal diameter the loss of all or most of the outer few layers has no substantial effect upon either the diameter or strength of the filaments.

The hydrogen halide gas is sorbed at the amide linkages of the polymers. The hydrogen halide breaks the hydrogen bonds. Upon hydrolysis carboxyl and amine hydrogen halide groups are formed at the former sites of the amide linkages. Because one of these groups is acidic and the other is basic their tendency is to promote the coloring of polymers with both basic and acid dyes. The physical appearance and texture of the treated polymers is also altered as a consequence of the method of this invention. The dense, smooth, shiny appearance of the surface is disrupted as a result of the broken bonds. The treated surface layers assume an opaque appearance which renders unnecessary the use of the usual titanium dioxide delustering agent. The presence of increased numbers of hydroxyl groups at the polymer surfaces improves the absorbency and antistatic qualities of the polymers by permitting the surfaces to take up water more readily. Since the surfaces of the polymers are somewhat roughened they adhere more easily to other materials. For example, nylon tire cords treated by the process of this invention adhere more readily to rubber. So long as the treatment is limited to surface layers there is no material loss in strength.

Although finding its greatest utility in the treatment of nylon filamentary material such as yarns, threads, and the like, the process of this invention is by no means so limited. It is equally well adapted to the treatment of film and sheet materials, rods, tubes, extruded and molded shapes and the like.

Any suitable apparatus may be used to carry out the method of this invention. Depending upon the form of the polymer to be treated, the method may be carried out either continuously or batch-wise. In the instance of filamentary material it is preferable to carry out the process continuously by passing the filaments through a sealing means into a closed gas chamber and then out through a sealing means into a moisture chamber or liquid bath. In carrying out a batch process, the polymer form to be treated is placed in a vessel and the vessel is closed. The hydrogen halide gas is introduced into the vessel, preferably after the vessel has been at least partially evacuated of air. The gas treated form may then be removed from the vessel and exposed to moisture in a second vessel or it may be treated in the gas treating vessel by replacing the hydrogen halide gas with moisture.

In the case of nylon filaments, it is desirable to treat the filaments directly as they are delivered from the spinnerettes. The nylon material is hot at this point and this tends to retard somewhat the sorption of hydrogen halide gas and affords a measure of control over the processing. The gas chamber and hydrolysis chamber are readily designed so as to permit the continuous filaments to be in the treating chambers for the requisite time while traveling at the same speed as their delivery rate from the spinnerettes.

Although the nylon treating process has heretofore been described as a two-step process, gas sorption and hydrolysis may be carried out virtually simultaneously where this form of treatment is more readily adaptable to existing circumstances. The polymer surfaces to be treated may be exposed to a mixture of gaseous hydrogen halide and water vapor and then quickly dried, with or without an intermediate rinsing in water.

In the event that the polymer surfaces are overexposed to hydrogen halide gas when treated according to the two-step exposure and hydrolysis treatment the excess hydrogen halide gas may be desorbed from the polymers prior to hydrolysis. In this instance, the excess gas is preferably desorbed by subjecting the polymers to vacuum at an elevated temperature between about 50° C. and the softening point of the polymers.

The invention is illustrated by the following examples:

*Example 1*

Undrawn bright Du Pont 66 nylon yarn was exposed at −78.9° C. to dry gaseous hydrogen chloride until the polymer had adsorbed two molecules of hydrogen chloride gas per mole of amide linkages. The system was then evacuated at room temperature for about two days. The polymers at this time still contained about three-fourths of a mole of hydrogen chloride gas per mole of amide linkages. The filaments were observed under the microscope and were found to be transparent. The fiber diameter, however, was 14 percent larger than before absorption of the gas. The yarn was then immersed in water and upon contact with the water, the fibers immediately became white and opaque. It was readily determined by simple tests that hydrolysis had broken the amide links. In this instance, because the desorption of the hydrogen chloride gas left a relatively large amount of hydrogen chloride gas in the polymer, it was overtreated for most purposes and its strength was somewhat impaired.

Example 2

Loops of nylon 6 (polycaprolactam) were held on a glass hook and then lowered into a vessel containing concentrated dry gaseous hydrogen chloride at atmospheric pressure and the loops were then immediately removed from the gas. The exposure of the bundle of fibers to the gaseous hydrogen chloride was for not longer than about 1 second. After exposure to the hydrogen chloride gas, the fibers felt stiffer to the touch than before exposure. The gas treated fibers were then immersed in wet steam. As a result of the exposure to moisture, the flexibility of the fibers was largely restored. The fibers had lost most of their previous shiny appearance. Examination of the gas and moisture treated fibers under a magnifying glass showed the fibers to be relatively more opaque than the untreated fibers. Pulling tests indicated that the nylon had not lost any appreciable tensile strength. The treated fibers were immersed in distilled water and left over night. This soaking removed the last traces of hydrogen chloride and the resulting nylon fiber product had a duller, delustered appearance than similar untreated fibers, but had substantially the same tensile strength.

Example 3

The experiment of Example 2 was repeated except that loops of nylon 66 (hexamethylenediamine-adipic acid) were substituted. The time of exposure to gaseous hydrogen chloride was the same, as was the exposure to wet steam. The same changes in physical appearance were observed.

Example 4

The experiments of Examples 2 and 3 were repeated except that the filaments were exposed to dry gaseous hydrogen chloride for a period of several seconds (i.e., 5 to 10 seconds). After removal from the gas and treatment with steam these fibers had a very opaque appearance but pulling tests indicated a considerable loss in strength. The same results were observed for both nylon 6 and nylon 66.

Example 5

The experiments of Examples 2 and 3 were again repeated with the exception that the nylon fibers were exposed to the hydrogen chloride gas for 30 seconds. Upon removal from the gas and treatment with steam, the fibers were completely opaque but showed relatively little strength. The same results were observed for both nylon 6 and nylon 66.

Example 6

A band or flat strand made up of many filaments of nylon was lowered rapidly into hydrogen chloride gas and rapidly removed so that the total exposure was less than about ½ second. The gas treated filaments were immediately exposed to wet steam and after this exposure to moisture, showed a distinct loss of lustre. At the same time, no loss in strength could be observed in pulling tests.

In each instance the surfaces of the nylon filaments upon hydrolysis changed in appearance from smooth, shiny and transparent to chalky and opaque. Neither the dimensions nor the strength of the filaments appeared to be materially altered.

It is apparent that many modifications and variations of this invention as hereinbefore set forth may be made without departing from the spirit and scope thereof. The specific embodiments described are given by way of example only and the invention is limited only by the terms of the appended claims.

We claim:

1. A method of altering the physical surface characteristics of water-insoluble linear polyamide condensation polymers which comprises exposing said polymers to a substantially anhydrous hydrogen halide in gaseous molecular form for a period between about ½ second and 120 minutes, at a temperature between about −80° C. and 104° C., a gas concentration between about 30 and 100 percent by weight and a pressure between about 1 mm. and 100 cm. Hg to cause a surface sorption only of said hydrogen halide gas molecules by the polymers to break the hydrogen bonds between the adjoining polyamide chains in the polymer surfaces and then, while said hydrogen halide gas molecules are sorbed at the polymer surface, exposing the hydrogen halide treated surfaces to moisture to hydrolyze the carbonyl-amide linkages between the links in the polyamide chains in the polymer surfaces.

2. The method according to claim 1 further characterized in that the hydrogen halide is hydrogen chloride.

3. The method according to claim 1 further characterized in that the moisture is steam.

4. The method according to claim 1 further characterized in that the exposure to hydrogen halide and subsequent hydrolysis are carried out as separate successive steps.

5. The method according to claim 1 further characterized in that the polymers are exposed to said hydrogen halide gas for a period between about ½ second and 10 minutes, at a temperature between about room temperature and the softening point of the polymers, at a relatively high gas concentration and at a relatively low pressure.

6. A method of altering the physical surface characteristics of water insoluble nylon filamentary material which comprises exposing said nylon to an atmosphere of substantially anhydrous hydrogen chloride gas at a temperature between about −80° C. and the softening point of the nylon, a gas concentration between about 30 and 100 percent by weight and a pressure between about 1 mm. and 100 cm. Hg for a time period between about ½ second and 120 minutes sufficient to cause a surface sorption only of said gas molecules by the nylon, and then, while said hydrogen chloride gas is sorbed at the nylon surface, immediately exposing the gas treated

Examples 7–15

| Example No. | Polymer Material | Hydrogen Halide Gas | Gas Uptake by Nylon (Percent by Wt.) | Gas Pressure | Temperature (° C.) | Treating Time | Moisture |
|---|---|---|---|---|---|---|---|
| 7 | Undrawn, bright, nylon 66 yarn, 6 denier per filament. | HCl | 1 | 5 mm. Hg | 0 | 1 min | Immersed in liquid H₂O. |
| 8 | ----do---- | HCl | 1 | 40 mm. Hg | 25 | 24 sec | Do. |
| 9 | ----do---- | HCl | 1 | 40 mm. Hg | −78 | 12 sec | Do. |
| 10 | ----do---- | HCl | 0.25 | 40 mm. Hg | 25 | 6 sec | Do. |
| 11 | ----do---- | HCl | 0.5 | 40 mm. HCl in dry air; total. | 25 | 24 sec | Do. |
| 12 | ----do---- | HCl | 1 | 760 mm. HCl | 25 | 1 sec | Do. |
| 13 | ----do---- | HBr | 1 | 40 mm. Hg | 25 | 24 sec | Do. |
| 14 | ----do---- | HCl | 1 | 40 mm. Hg | 25 | 24 sec | Struck with live steam. |
| 15 | Nylon 6 | HCl | 1 | 40 mm. Hg | 25 | 24 sec | Immersed in liquid H₂O. | nylon to moisture to hydrolyze the amide bonded hydrogen linkages between the polyamide chains in the nylon surfaces.

7. The method according to claim 6 further characterized in that the moisture is steam.

8. The method according to claim 6 further characterized in that the nylon is exposed to said hydrogen chloride gas for a period between about ½ second and 10 minutes, at an elevated temperature between about room temperature and the softening point of the nylon, at a relatively high gas concentration and at a relatively low pressure.

9. A method of altering the physical surface characteristics of water insoluble linear polyamide condensation polymers which comprises exposing said polymers to a substantially anhydrous hydrogen halide in gaseous molecular form for a period between about ½ second and 120 minutes, at a temperature between about −80° C. and 104° C., a gas concentration between about 30 and 100 percent by weight and a pressure between about 1 mm. and 100 cm. Hg and then, while said hydrogen halide gas molecules are present at the polymer surfaces, exposing the hydrogen halide treated surfaces to moisture.

10. A method of altering the physical surface characteristics of water insoluble nylon filamentary material which comprises exposing said nylon to an atmosphere of substantially anhydrous hydrogen chloride gas at a temperature between about −80° C. and the softening point of the nylon, a gas concentration between about 30 and 100% by weight and a pressure between about 1 mm. and 100 cm. Hg for a time period sufficient to cause a surface sorption only of said gas molecules by the nylon and then, while said hydrogen chloride gas is sorbed at the nylon surface, immediately exposing the gas treated nylon to moisture.

References Cited in the file of this patent

UNITED STATES PATENTS

| | | |
|---|---|---|
| 2,251,508 | Watson | Aug. 5, 1941 |
| 2,876,524 | Reyerson | Mar. 10, 1959 |

FOREIGN PATENTS

| | | |
|---|---|---|
| 568,092 | Great Britain | Mar. 19, 1945 |
| 734,493 | Great Britain | Aug. 3, 1955 |

OTHER REFERENCES

Du Pont, Bulletin X–48, March 1956, page facing Table I and Tables VII–XII.